No. 798,052. PATENTED AUG. 22, 1905.
H. W. ALDEN.
STEERING MECHANISM FOR MOTOR VEHICLES.
APPLICATION FILED JUNE 19, 1905.

Witnesses.
Rudolph Riege
F. F. Chudoba.

Inventor.
Herbert W. Alden,
by Hermann F. Cuntz
his atty.

UNITED STATES PATENT OFFICE.

HERBERT W. ALDEN, OF HARTFORD, CONNECTICUT, ASSIGNOR TO ELECTRIC VEHICLE COMPANY, OF JERSEY CITY, NEW JERSEY, A CORPORATION OF NEW JERSEY.

STEERING MECHANISM FOR MOTOR-VEHICLES.

No. 798,052.     Specification of Letters Patent.      Patented Aug. 22, 1905.

Original application filed June 16, 1902, Serial No. 111,816. Divided and this application filed June 19, 1905. Serial No. 265,956.

*To all whom it may concern:*

Be it known that I, HERBERT W. ALDEN, a citizen of the United States, residing in Hartford, county of Hartford, State of Connecticut, have invented certain new and useful Improvements in Steering Mechanism for Motor-Vehicles, of which the following is a specification, reference being had to the accompanying drawings, forming a part hereof, this application being a division of application, Serial No. 111,816, filed June 16, 1902.

This invention relates in general to operating mechanism, and more particularly to steering mechanism for motor-vehicles or the parts of such manipulated by the operator and connections between such parts for transmitting the operating movement to the deflecting or steering road-wheels. As the steering of a road-vehicle, particularly when moving over rough roads or at considerable speed, is one of the vital points of construction, it is necessary that these parts be substantially made so that they will resist wear under usual use and resist any ordinary or excessive strains they are liable to be subjected to. Furthermore, the parts should be easily operated by the occupant, while being convenient and not encumber any more than necessary the occupant's space.

The object of this invention is to meet these and various requirements, as will hereinafter be more specifically referred to.

While it has heretofore been suggested to move the steering wheel or lever operated by the driver to and from the seat for convenience, one of the objects of my present invention is an improved construction and arrangement for this purpose.

While described as particularly applicable to steering mechanisms, certain novel features of my invention are equally useful in other connections, as for operating other controlling means.

My invention is more fully described hereinafter with reference to the accompanying drawings, in which it is embodied in practical form, though it will be clearly understood that numerous variations can be made.

Figure 1:
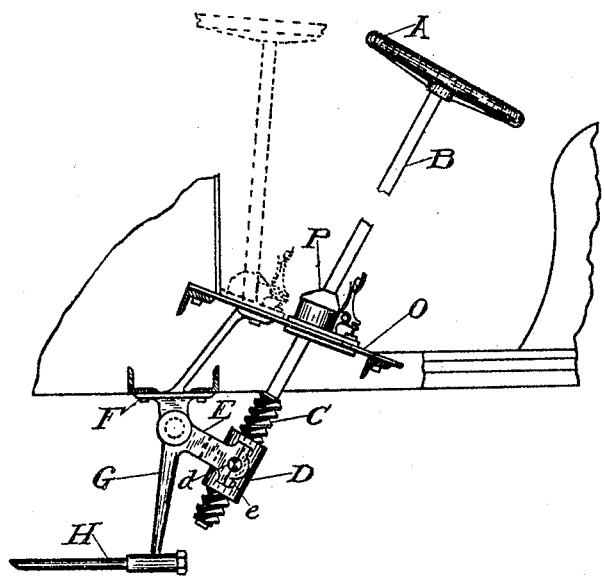
Figure 5:
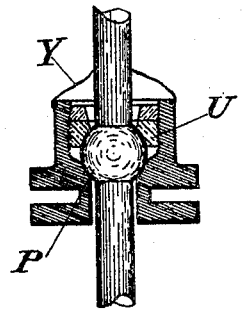
Figure 2:
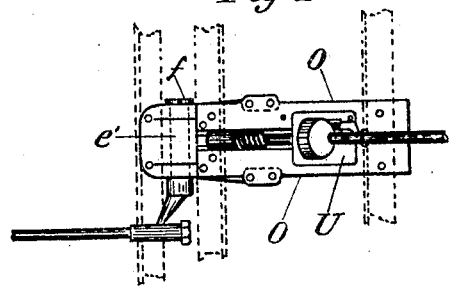
Figures 3, 4:
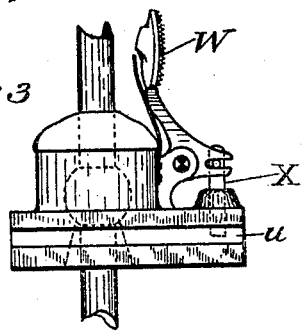

In the drawings, Figure 1 is a side view of the forward portion of an automobile, showing steering mechanism embodying my invention. Fig. 2 shows the construction of Fig. 1 in plan, with portions of the body to which the mechanism is attached. Figs. 3 and 4 show in detail the sliding thrust-bearing bracket, such as is embodied in Figs. 1 and 2, respectively, in side elevation and rear elvation. Fig. 5 shows a section of the sliding bearing-bracket, the same taken vertically through the axis of the steering-shaft and transverse to the vehicle.

In the embodiment of my invention A is the steering wheel or handle, which is mounted upon a shaft B, which carries at its lower end a threaded or toothed member C. The latter engages a threaded or toothed block D, operatively connected with the rock-shaft arm E, supported in a bracket F, and connected with an oscillating arm G, which moves a rod H, connected in the usual manner with the road-wheels. In the form shown bracket F is rigidly attached to the framework or body of the vehicle, in which there is also attached in this form the bracket O. This bracket O supports a thrust-bearing P, in which the steering-pillar B is mounted.

In the oscillation of the arm E, which is effected to deflect the road-wheels, the end of that arm moves in an arc of a circle, and therefore not always in the axis of the steering-pillar in case the latter should be stationary. To accommodate this motion of an oscillating arm of this sort in a steering mechanism, it has heretofore been usual to embody relatively complicated connections, so that the engaging members will not be strained or wear excessively and not be subjected to lost motion.

In this invention I have supported the block D by trunnions in the end of this arm, and the thrust block or bearing carrying the steering-pillar B, I also support so that it when in operating position is susceptible of slight oscillation. This oscillation of the pillar-support is substantially about an axis parallel with the axis of oscillating arm E. To this end block D has trunnions $d$, supported in bearings $e$, while E is forked to carry the block and has a long bearing $e'$, supported in the bracket F, the long bearing effectually preventing movement due to distorting strains. Shaft $f$, carried in ample bearings in bracket F, firmly supports arm E and also supports the depending arm G, so that the slightest movement of the arm E due to the movement of block D, effected by a rotation of screw C, is immediately transmitted without any lost motion to the depending arm G and through suitable connections, such as those described, to the road-wheels.

The shaft thrust-bearing, as hereinafter described, will accommodate any lateral movement of the end of the shaft, not alone that due to the traverse block moving in an arc. In the form of construction shown the connections at the lower end of the shaft may move in many different ways, and the supporting of the shaft accommodates any movement or oscillation, even if non-coincident with the normal axis of the shaft. Whether the oscillating part moves in a curve or straight line not coinciding with the normal shaft-axis the thrust-bearing will accommodate the consequent lateral displacement of the lower shaft end without any cramping, increased wear, or other disadvantage.

For the advantageous operation of a steering mechanism of this sort it is very necessary that the thrust-bearing on the shaft be held in substantially fixed relation with the bearings of the part oscillated by the shaft. In this case the bracket F, supporting the rock-shaft, should be held in fixed relation with the bracket O, supporting the bearings P. With these bearings in substantially rigid relation the slightest movement due to the threaded part in the form shown will cause an immediate response in oscillation of the depending arm G, and consequently deflection of the steering road-wheels. When convenient, I should prefer to embody these bearings in the same casting or built-up piece to insure this relative rigidity. However, in the form shown there are some other advantages in having the traverse-block and the oscillating bearing on the shaft some distance apart, for the reason that the slight movement of the lower end of the shaft due to the arc described by the arm G, which substantially only amounts to the verse sine of the angle of oscillation of arm G from its central position, causes a deflection of the hand-wheel. In practice with the bearings conveniently located in ordinary construction the oscillation of the hand-wheel due to this cause probably would be less than an inch; but even if more than this, as the maximum is reached only when turning the wheels hard over, and therefore very seldom, it would be no inconvenience.

In order that the steering hand wheel or lever can be moved out of the way of the operator when the vehicle is stopped or at any time for convenience, the spherical thrust-bearing P is provided. This construction of spherical bearing can be very advantageously supported in a movable bracket U, as shown in the drawings. However, such a sliding bracket-support is not solely adapted to such a thrust-bearing, but can also be made to embody other forms of bearings—as, for instance, such with trunnions—though I prefer the form shown.

In Figs. 1 to 5 thrust-bearing P is supported in the bracket U by means of a seat and complementary screw-cap with locking means, so that the same may be adjustably held in such position. The movable bracket U, with slotted sides u, is supported by the engagement of the latter with plates O, rigidly held on the framework or body. These guides are also rigidly connected with the base or supporting-bracket F, and therefore with the bearings of the bell-crank E G, so that the thrust-bearing on the rotating or operating shaft will be held in fixed relation with the bearing of the oscillated member E. In some forms I prefer to secure this rigidity, as already mentioned, by embodying the supporting means for these bearings or their bases in an integral casting, so as to absolutely prevent any displacement. On the movable bracket U, I secure a foot-press W, connected to operate a latch X, which engages in holes in the guides, so as to lock the movable bracket in predetermined positions. It will be seen in this latter construction that by pressing upon the foot-piece W the latch X is drawn, and the back of the foot-press engages with the pillar, so that a further pressure exerted by the foot is against the pillar, and without further straining the small parts operating the latch enables the occupant to push the whole pillar forward by means of his foot and throw it out of his way, leaving a clear exit from the vehicle. Upon release of the foot the spring will throw the foot-press back and drive the latch X into another hole provided to secure the steering-pillar in its forward position. By having the bracket move in this way the thrust-bearing is always operatively held, no matter what position the steering-shaft is in, so that in case the vehicle should start when the occupant has not drawn the steering-wheel into convenient position the vehicle will still be under perfect control and the steering-wheels always operatively connected. As the movement of the pillar forward away from the operator is about a center in the oscillating lever E, the bracket U should move in the arc of a circle, which, however, is not of great curvature for the angularity of throw usually necessary; but in some cases I would construct the guides O on an arc about the normal center of forward oscillation of the steering-shaft, which would then necessitate machining the engaging bearings or bracket U to fit the curve, which would increase the expense of construction. In the form shown I have used the simpler construction, consisting of the straight guide-plates, as the movement of the pillar forward will only tend to slightly deflect the steering-wheels as it is pushed to its upright position and will in no way interfere with the proper operation and general advantages of the construction.

To allow for the oscillation of the steering-shaft in the movable bracket in the form shown, a slight opening is necessary, which I cover by means of a leather or other small cap Y.

In the parts of a steering mechanism with which my invention deals in general present construction in some cases involves the embodiment of the thrust-bearing of the shaft and the bearing of the members oscillated by the shaft in close proximity. When this is done, the bearing supporting the shaft and supporting the oscillating bell-crank or levers is easily made in one piece, such as a casting, and can therefore be machined so that the bearings will be very accurately located with respect to each other.

If it is desirable to have the thrust-bearing and the oscillating-shaft bearing some distance apart, this machining is not so readily accomplished and there is more tendency for relative displacement of the bearings, while with built-up parts in the framework of the vehicles or in conjunction with the framework of the vehicle it may in cases be more expensive to secure absolute accuracy in the relative location of these bearings, and for this latter reason my construction holds out distinct advantages. It will be seen that with the spherical joint or thrust-bearing, as shown in the figures, there is provision made for oscillating in at least one direction, and this can be increased to permit deflection of the steering-shaft in other directions as well. In addition to this I so arrange the engaging member on the oscillating lever as to permit different angularity of the steering-shaft. A ball-and-socket joint with side wings to prevent rotation meets the requirements at that end of the steering-shaft, and if the engaging threaded block is so mounted in the oscillating lever it will be seen that the bell-crank lever and bearings can be permanently secured on the framework without accurate alinement with the upper shaft-bearing or bearing-bracket, which can then be secured to the framework permanently and irrespective of the precise position of the former bracket. This absence of a necessity for absolute alinement of the parts would greatly facilitate assembling the mechanism, and having the ball-joints it will be seen that any disalinement is entirely compensated for in the joint, which, in spite of the disalinement, avoids any chance of cramping or jamming of parts. This would also enable the hand operating-wheel on a vehicle to be located differently in vehicles under construction without changing the whole system of steering connections and would only involve a lateral or other desired displacement of the steering-shaft-supporting bracket. A displacement of this shaft quite oblique to the plane of movement of the oscillating lever would of course not be desirable; but there is no trouble in any slight obliquity.

I do not wish to confine myself to the precise features or details of construction hereinbefore described and shown, as my invention may be carried out with various modifications or in some cases reversal of parts still embodying its advantages and its main features.

What I claim, and desire to secure by Letters Patent, is—

1. In an automobile steering-gear, an operating hand-wheel, a steering pillar or shaft actuated thereby, projecting downward through the floor of the vehicle, a support on the floor of said vehicle including a slide movable to and fro, mechanism at the lower end of said shaft below the body of the vehicle, and connections and individually-pivoted steering-wheels deflected thereby.

2. In combination in a steering-gear for an automobile, a reciprocating or oscillating member supported below the body of the vehicle, an upwardly-extending shaft or steering-pillar, interengaging threaded or toothed parts between said shaft and oscillating member, a slotted opening in the floor of said vehicle, a slide moving in proximity to said slot, having an opening, said shaft or pillar passing through said slide-opening and supported thereby.

3. In an automobile steering mechanism in combination with individually-pivoted wheels and connections, an oscillating bell-crank lever supported below the body of the vehicle, with coöperating threaded or toothed members, a steering-shaft projecting through the floor of the vehicle and through a sliding member supported on the floor of the vehicle, guides coöperating with said sliding member and means for locking said slide in a predetermined position whereby the steering-shaft may be shifted in an inclined position and moved to an upright.

4. In an automobile steering mechanism, a sliding floor-plate, guides or supports therefor, a rotatable steering-shaft projecting through said slide, mechanism at the lower end of said shaft coöperating with an oscillating member having bearings in fixed relation with the slide-supports.

5. In an automobile steering mechanism, a sliding floor-plate, a rotating steering-shaft projecting through said plate, locking device to hold said plate in a predetermined position, means accessible from the rear of said shaft to operate said locking device.

This specification signed and witnessed this 18th day of May, A. D. 1905.

HERBERT W. ALDEN.

In presence of—
    RUDOLPH RIEGE,
    F. F. CHUDOBA.